No. 776,600. PATENTED DEC. 6, 1904.
C. J. KOENIG.
GLASS PRESSING MACHINE.
APPLICATION FILED AUG. 28, 1903.
NO MODEL. 3 SHEETS—SHEET 2.
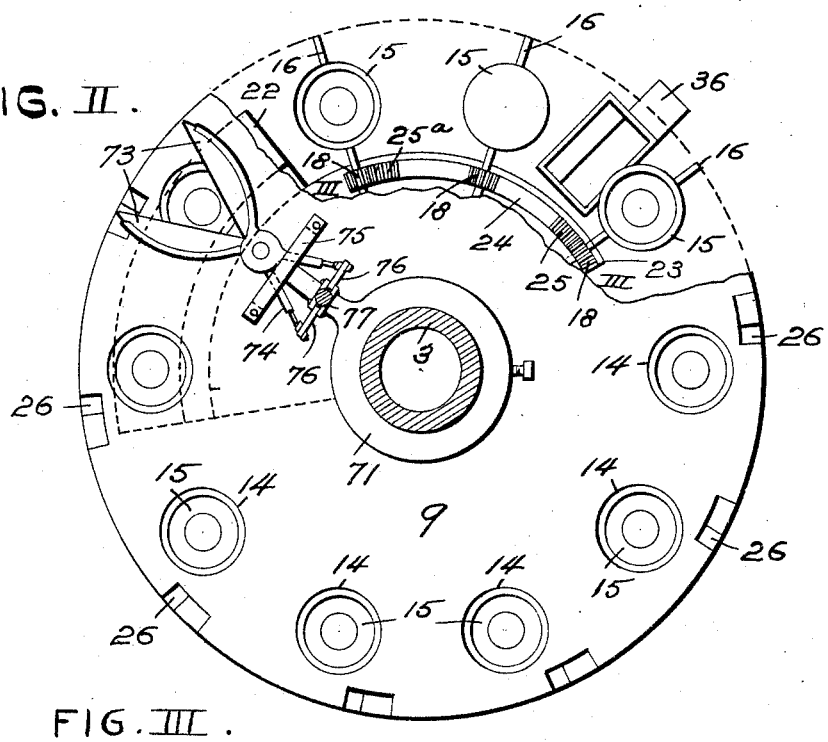
FIG. II.
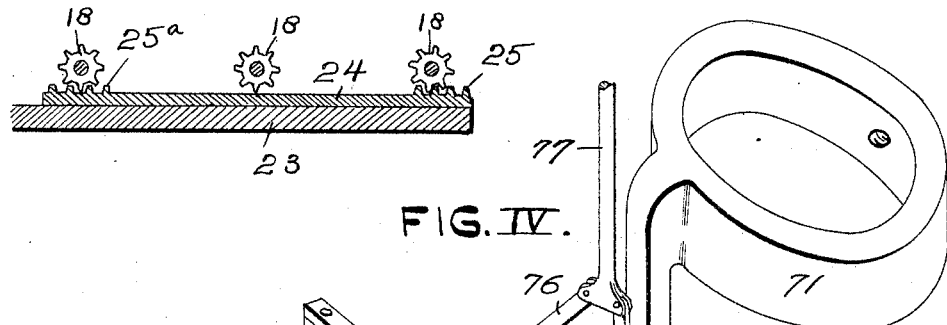
FIG. III.
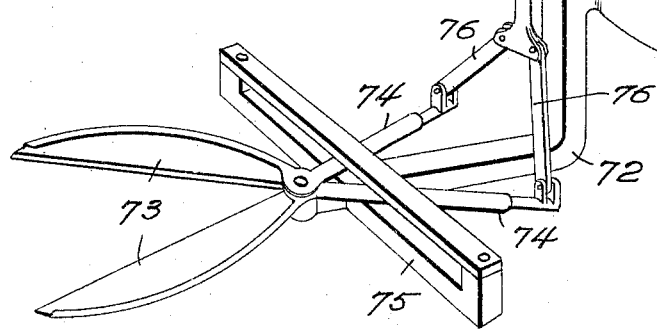
FIG. IV.
ATTEST
B. J. O'Neill
T. J. Ferrell
INVENTOR:-
Christian J. Koenig No. 776,600. PATENTED DEC. 6, 1904.
C. J. KOENIG.
GLASS PRESSING MACHINE.
APPLICATION FILED AUG. 28, 1903.
NO MODEL. 3 SHEETS—SHEET 3.
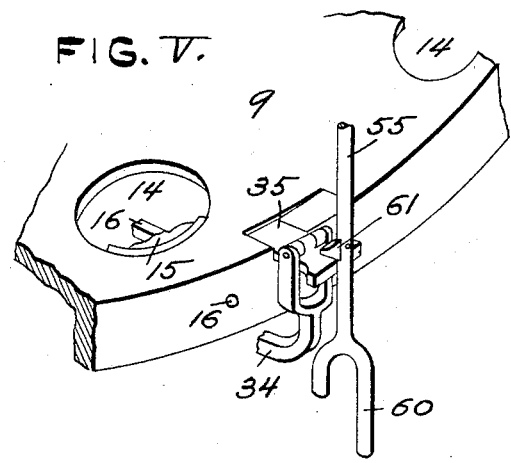
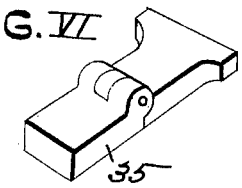
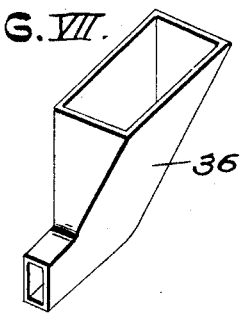
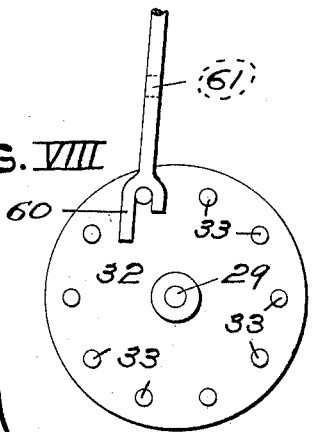
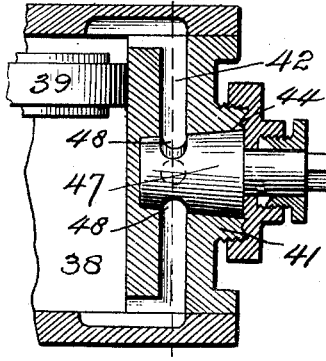
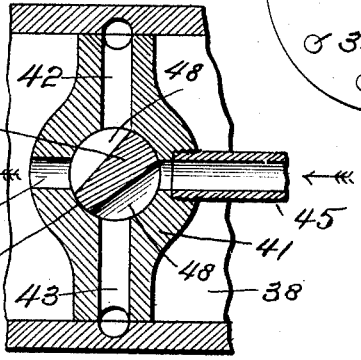
ATTEST
B. J. O'Neill
T. J. Terrell
INVENTOR:—
Christian J. Koenig No. 776,600.

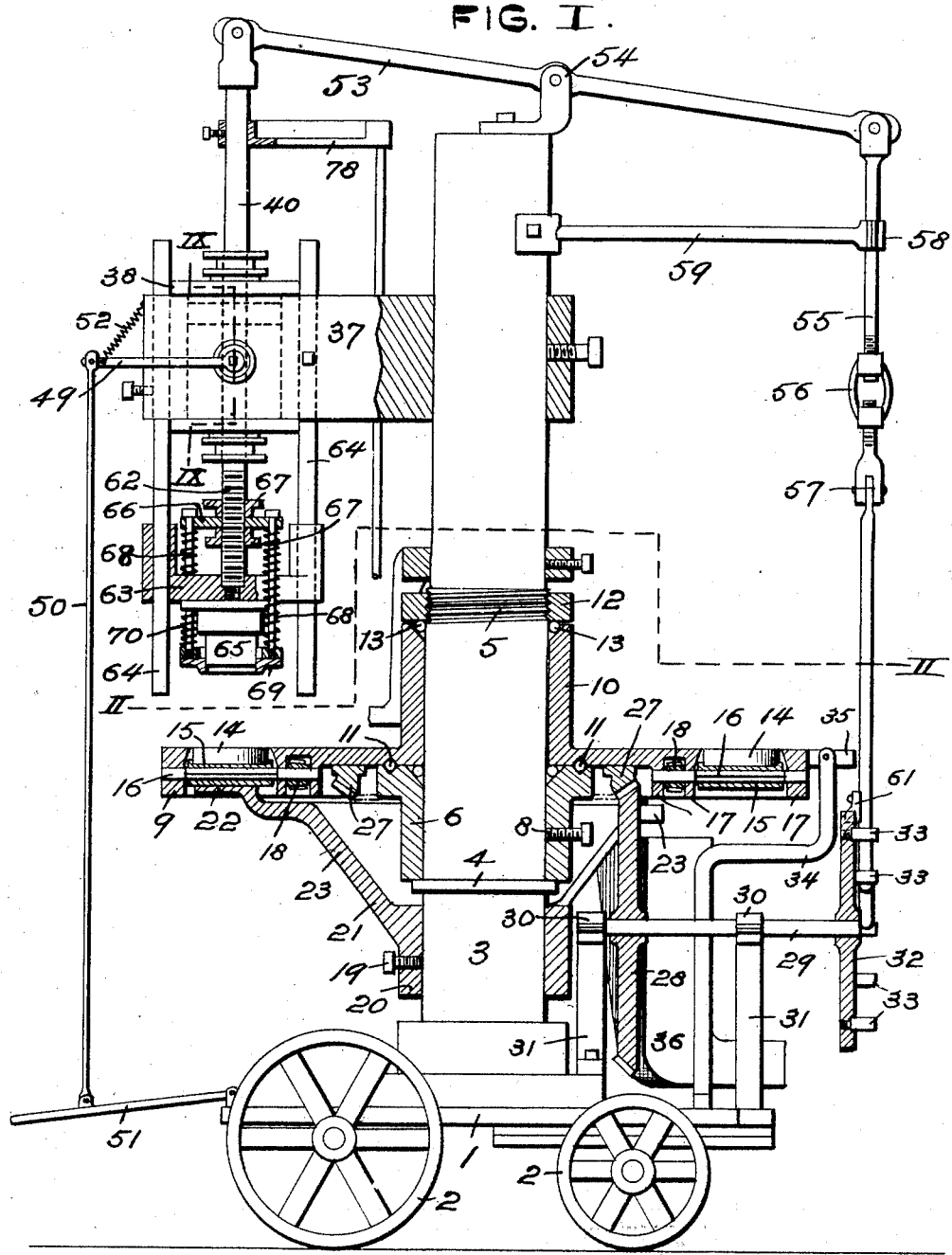

Patented December 6, 1904.

UNITED STATES PATENT OFFICE.

CHRISTIAN JULIUS KOENIG, OF ALTON, ILLINOIS.

GLASS-PRESSING MACHINE.

SPECIFICATION forming part of Letters Patent No. 776,600, dated December 6, 1904.

Application filed August 28, 1903. Serial No. 171,064. (No model.)

*To all whom it may concern:*

Be it known that I, CHRISTIAN JULIUS KOENIG, a citizen of the United States, residing at Alton, county of Madison, State of Illinois, have invented certain new and useful Improvements in Glass-Pressing Machines, of which the following is a full, clear, and exact description, reference being had to the accompanying drawings.

My invention relates generally to glass-pressing machines, and more particularly to a machine adapted to press a given quantity of molten glass into shape corresponding to the mold and die used in the machine.

The object of my invention is to construct a simple, strong, and durable machine that will quickly and automatically perform the operations required to press all kinds of small glass articles.

To the above purposes my invention consists in new and novel features of construction and arrangement of parts, that will hereinafter be more fully described, pointed out in the claims, and illustrated in the accompanying drawings, in which—

Figure I is a vertical section taken through the center of the machine. Fig. II is a horizontal section taken on line II II of Fig. I. Fig. III is a detail sectional view taken on line III III of Fig. II. Fig. IV is a perspective view of the glass-cutting shears made use of in my improved machine. Fig. V is a perspective view of the locking device for the revolving table of the press. Fig. VI is a perspective view of the hinged locking-finger made use of in the locking device. Fig. VII is a perspective view of the chute or hopper that receives the glass articles as they are discharged from the press. Fig. VIII is an elevation of a disk and operating-lever therefor that forms a part of the means for imparting an intermittent motion to the revolving table of my improved machine. Fig. IX is an enlarged detail sectional view taken on line IX IX of Fig. I. Fig. X is a vertical view taken on line X X of Fig. IX.

Referring by numerals to the accompanying drawings, 1 indicates a suitable base mounted on traction-wheels 2 in order that the machine may be readily moved from one position to another. Fixed to the center of the top of the base 1 is a post 3, that is provided a short distance above the base with an integral flange 4 and a distance above said flange with a thread 5. The portion of the post above the thread is slightly reduced in diameter relative to the lower portion. Positioned around the post and resting on the flange 4 is a collar 6, held by a set-screw 8.

9 indicates the revolving table, the same being circular and provided with a centrally-arranged sleeve 10, that surrounds and bears upon the post 3. This table bears directly upon the collar 6, there being ball-bearings 11 arranged between said collar and table in order that the latter will readily revolve when in operation. A nut 12 screws onto the thread 5 to retain the table in position, there being ball-bearings 13 arranged between said nut and the top of the sleeve 10. Formed through the table adjacent its edge at equal distances apart are circular mold-openings 14, in which are swingingly mounted molds 15. Each mold is keyed onto a radially-arranged shaft 16, the ends of which are journaled in bearings 17, formed on the under side of the table 9. Keyed onto the inner end of each shaft 16 is a pinion 18.

Held by a set-screw 19 to the lower portion of the post 3 is a collar 20, that is provided with an upwardly and forwardly extending arm 21, that carries on its upper end a horizontally-arranged segmental plate 22, that extends from the front of the machine a short distance around to the left and occupies a position immediately below the under side of the table. The molds in their travel with the table ride directly on the top of this plate 22, it serving as a support for the mold in which the glass is being pressed and the next adjacent left-hand mold. (See Figs. I and II.) The arm 21 is provided with an integral plate 23, that extends around to the left hand and carries on its upper face a segmental plate 24, on the top of each end of which is formed teeth 25 and 25ª. (See Figs. II and III.) These teeth are in the path of travel and are engaged by the pinions 18 on the shafts 16. Formed in the top surface of the edge of the table 9 adjacent each mold-opening 14 is a notch or recess 26, in which engages a locking device hereinafter described.

Formed on or fixed to the under side of the table is a circular rack 27, with which meshes the teeth of a bevel gear-wheel 28. The gear-wheel 28 is carried by a shaft 29, that extends rearwardly from the post 3 and is journaled in bearings 30, carried by standards 31, that extend up from the base 1. On the outer end of the shaft 29 is fixed a disk 32, in the outer face of which is seated pins 33, the same being arranged at equal distances apart and there being the same number of pins as there are molds in the table 9. (See Fig. VIII.) Extending upwardly from the rear end of the base 1 to a point adjacent the edge of the table 9 is a standard 34, the upper end of which is bifurcated and has pivoted therein a locking-finger 35. This finger consists of two members hinged together in the middle with a knife-blade hinge-joint in order that each part can swing upwardly. The inner member of the finger normally rests in one of the notches 26 to lock the table against movement in a forward direction, while the other member extends outwardly from the end of the standard 34. A hopper 36 is positioned with its receiving end immediately below the path of travel of the molds and adjacent the end of the plate 23.

Held on the upper portion of the post 3 and projecting forwardly therefrom is an arm 37, in the outer end of which is a vertically-arranged cylinder 38. A piston 39 operates in this cylinder, the piston-rod 40 extending upwardly and downwardly through packing-boxes in the ends of the cylinder.

A valve-casing 41 is formed integral with one side of the cylinder 38, there being ducts 42 and 43 leading, respectively, to the top and bottom of the cylinder from the central chamber 44, occupied by the valve. Leading into one side of the chamber 44 is an inlet-port 45 and on the opposite side is an exhaust-port 46. Occupying the chamber 44 is a tapered valve 47, provided on opposite sides with grooves 48, adapted to establish communication between the various ports in the valve-casing. Upon the squared end of the valve-stem is fixed the end of a lever 49, that extends outwardly and has pivoted to its end the upper end of a rod 50. The lower end of this rod 50 is pivoted to a treadle or foot-lever 51, that is fulcrumed to the front of the base 1. A retractile coil-spring 52 is secured at one end to the end of the lever 49 and by its opposite end to the arm 37. The tendency of this spring is to hold the foot-lever 51 and lever 49 elevated, and the valve 47 is correspondingly held, so that communication is established between the inlet-port 45 and the lower end of the cylinder 38, thus keeping the pressure medium beneath the piston 39 and the latter elevated to its limit of movement. (See Figs. IX and X.)

Pivotally connected to the upper end of the piston-rod 40 is a lever 53, that is fulcrumed to a bracket 54 on the upper end of the post 3. The rear end of this lever is pivoted to the upper end of a vertically-arranged rod 55, which is provided with a turnbuckle 56 and a hinge-joint 57. The portion of the rod above the turnbuckle slides through a fixed bearing 58, carried by an arm 59, extending rearwardly from the post 3. The lower end of the rod 55 is bifurcated in the form of an inverted U, one of the fingers 60 of said bifurcated end being longer than the other. This bifurcated end is adapted to successively engage the pins 33 on the face of the disk 32. The lower portion of this rod 55 carries a finger 61, that is adapted to engage the outer part of the finger 35 during the downward movement of said rod 55. The lower end of the piston-rod 40 is screw-threaded, as indicated by 62, and seated thereon is a block 63, which slides vertically on guide-rods 64, depending from the arm 37. From the under side of this block 63 depends a cylindrical die-block 65, that forms the upper half of the mold.

A plate 66 is arranged on the piston-rod 40 above the block 63, which plate is adjustably held by the lock-nuts 67. Rods 68, loosely seated in the plate 66, depend therefrom and are screw-seated at their lower ends in a pressure-ring 69, that slides upon the die-block 65. Expansive coil-springs 70 are arranged upon the rods 68 between the plate 66 and the pressure-ring 69.

Located upon the post 3 above the thread 5 thereon is a collar 71, that is provided with an integral arm 72, which extends downwardly and outwardly to a point immediately over the table 9 and just inside the path of travel of the molds 15.

Pivotally held to the end of the arm 72 is a pair of shears 73, that operate just over that part of the table in which is located the molds 15. The handles 74 of the shear-blades extend through a yoke 75, carried by the arm 72, and are connected by links 76 to the lower end of a rod 77, that extends upwardly and is fixed to the end of an arm 78, carried by the upper end of the piston-rod 40.

The shears 73 operate directly over the mold next adjacent and to the left-hand of the mold that is directly beneath the die-block 65.

The operation of my improved machine is as follows: Assuming that the proper quantity of molten glass is located upon the mold 15 within the mold-opening 14, that is directly beneath the die-block 65, the operator after placing a quantity of molten glass in the next adjacent left-hand mold-opening (the one directly beneath the shears 73) places his foot upon the outer end of the treadle 51 and bears down thereon. The rod 50 is drawn down, also the outer end of the lever 49, and the valve 47 is thus partially rotated, so that communication is established from the inlet-port 45 to the duct 42 and from the duct 43 to the exhaust-port 46. The pressure medium will now pass into the top of the cylinder 38 above the piston 39, forcing the latter downwardly, the pressure medium below the piston 39 exhausting out through the duct 43 and port 46. All the parts carried by the piston-rod 40 will with this movement be carried downwardly and the die-block 65 will press the molten glass within the mold immediately beneath it into the proper shape. The pressure-ring 69 in moving downwardly engages the molten glass before the die-block 65, and as said block continues to move downwardly it passes through said ring, the springs 70 being slightly compressed. When the die-block returns upwardly, it leaves the pressed glass first, and the pressure-ring prevents any part of the pressed glass from adhering to the die-block. When the piston-rod 40 moves downwardly, the rod 77 moves correspondingly, and in so doing the handles 74 of the shears are moved outwardly, thus closing the shear-blades 73 and cutting off the proper amount of molten glass from a punty held above the adjacent left-hand mold. The downward movement of the piston-rod 40 necessarily elevates the rear end of the lever 53 and the rod 55 carried thereby. The bifurcated lower end of this rod withdraws from the pin 33, with which it was engaged, and swings over until the long finger 60 engages against the adjacent pin 33, these parts being now in proper position to partially rotate the disk 32 and contiguous parts with the next downward movement of the rod 55. The glass having thus been pressed, the operator removes his foot from the treadle, and the coil-spring 52 causes the lever 49, rod 50, and treadle 51 to move upwardly into their normal positions. The valve is thus returned to its normal position, and the pressure medium is again turned into the lower end of the cylinder 38 and exhausted from the upper end thereof. With the upstroke of the piston and piston-rod the rod 77 is elevated, which opens the shears, and the rear end of the lever 53, carrying the rod 55, is moved downwardly. The bifurcated lower end of the rod 55 engages one of the pins 33, as hereinbefore stated, and as the rod 55 returns to its normal position the disk 32, carrying the pins 33, is rotated a distance corresponding to the space between the pins 33. The inner end of the hinged finger 35 normally rests in one of the notches 26 to hold the table 9 against forward rotation. During the upward movement of the rod 55 the finger 61 strikes the outer end of the finger 35 and swings the same upwardly without moving the inner end, that rests in one of the notches 26. As the rod 55 descends the finger 61 carried thereby engages the top of the outer portion of the finger 35 and depresses the same, which necessarily elevates the inner end of said finger 35 out of the notch 27, during which time the table is started on its partial rotation, as will now be described. As the disk 32 is partially rotated the bevel gear-wheel 28 will be likewise moved, and said gear-wheel meshing with the rack 27 will cause the table 9 to be moved one step or part of its complete revolution around the post 3. The movement of the table is sufficient to bring the next adjacent left-hand mold, which was previously filled with molten glass, into a position directly beneath the die-block 65. The operator now moves the treadle downwardly again, and the operations as described are repeated, the pressing of the glass in the mold and the cutting off by the shears being accomplished by the downstroke of the piston and parts carried thereby and the movement of the table being accomplished by the upstroke of said piston. As the table continues to revolve step by step or intermittently, as described, the pressed glass within the molds is carried around until the pinions 18 on the shafts 16 of the molds engage with the teeth 25 of the segment 24. There are just enough of these teeth 25 to cause the pinions and parts carried thereby to make a half-turn. Consequently when the pinions engage with said teeth 25 each mold 15 is inverted, and the pressed-glass article, which by this time has sufficiently cooled, is delivered into the hopper 36. The mold 15 travels in an inverted position until the pinion 18 engages with the teeth $25^a$, which engagement causes the mold to be turned right side up, and in this position it passes onto the plate 22 to again receive a quantity of molten glass.

A machine as herein described is simple in construction and operation, requires but a single attendant, is practically automatic in its action, and by its use large numbers of small pressed-glass articles can be neatly turned out in a comparatively short space of time.

I claim as my invention—

1. In a glass-pressing machine, a standard, a table arranged for rotation upon said standard, a series of molds carried by said table, a cylinder arranged above the table over the path of travel of the molds, a piston operated within said cylinder, a piston-rod extending above and below said cylinder, a valve for controlling the admission of compressed air or steam into the ends of said cylinder, a die carried by the lower end of the piston-rod, and means connected with the upper end of the piston-rod for partially rotating the table when said piston-rod moves upwardly, substantially as specified.

2. In a glass-pressing machine, a standard, a table arranged for rotation thereon, a series of tilting molds carried by the table, means whereby said table is intermittently rotated, a cylinder positioned above the table, a piston operating therein, a piston-rod extending above and below the cylinder, a die carried by the lower end of the piston-rod, suitable connections from the upper end of the piston-rod to the table-moving mechanism, a pair of shears held in operative position above the path of travel of the tilting molds, and suitable connections from the handles of said shears to the piston-rod above the cylinder, substantially as specified.

3. In a glass-pressing machine, a post, a table rotating thereupon, a series of tilting molds arranged in said table, a cylinder positioned above the table over the path of travel of the molds, a piston operating within said cylinder, a piston-rod extending above and below the cylinder, means whereby steam or air under pressure is admitted to the ends of the cylinder, a die carried by the lower end of the piston-rod, a pair of shears held in operative position above the path of travel of the molds, links pivotally connected to the ends of the handles of said shears, and suitable connections from said links to the piston-rod above the cylinder, substantially as specified.

4. In a glass-pressing machine, a standard, a table rotatably arranged upon said standard, means whereby said table is intermittently rotated, and in which table is formed circular apertures at equal distances apart, radially-arranged shafts journaled to the under side of the table, and extending across the circular openings therein, molds carried upon said radially-arranged shafts, pinions fixed upon said shafts, a segmental plate positioned beneath the table and beneath the path of travel of the pinions, and racks formed integral with each end of said segmental plate, with which racks the pinions engage, substantially as specified.

5. In a glass-pressing machine, a post, a table arranged for rotation thereon, a series of tilting molds carried by said table, a vertically-moving die positioned above the path of travel of said molds, means whereby said die is moved downwardly onto the molds in succession, a circular rack secured to the under side of the table, a shaft journaled beneath the table, a bevel gear-wheel mounted upon said shaft, and meshing with said rack, a disk mounted upon the outer end of the shaft, pins projecting from the outer face thereof, and a vertically-moving rod held for operation above and in front of said disk, the lower end of which rod is bifurcated, and adapted to successively engage the pins, substantially as specified.

6. In a glass-pressing machine, a post, a table arranged for rotation thereupon, means arranged beneath the table for imparting an intermittent rotary motion to said table, a series of tilting molds carried by the table, a pair of shears held for operation above the path of travel of the molds, a cylinder held above the path of travel of said molds, a piston operating in said cylinder, a valve in said cylinder for controlling the admission of steam or compressed air into the ends of said cylinder, a piston-rod extending above and below the cylinder, a die carried by the lower end of the piston-rod, suitable connections from the shears to the piston-rod above the cylinder, and suitable connections from the upper end of the piston-rod to the table-rotating means, substantially as specified.

7. In a glass-pressing machine, a post, a table arranged for rotation thereon, a series of tilting molds carried by said table, means arranged beneath said table for causing said molds to turn completely over, a segmental plate arranged beneath said table, upon which said molds ride during a portion of their travel, means arranged beneath the table for imparting an intermittent rotary motion to said table, a cylinder held above the table and above the path of travel of the molds, a piston within said cylinder, a valve in said cylinder for controlling the admission of steam or compressed air to the ends of said cylinder, a piston-rod extending above and below the cylinder, a die carried by the lower end of the piston-rod, and suitable connections from the upper end of the piston-rod to the table-rotating means, substantially as specified.

8. In a glass-pressing machine, a post, a table rotating thereon, dies carried by the table, pressing mechanism arranged above the table, mechanism arranged beneath the table for imparting an intermittent rotary motion to the table, and a lever pivoted to the post, the ends of which lever are pivotally connected to the pressing mechanism and to the table-rotating mechanism, substantially as specified.

9. In a glass-pressing machine, a rotating table, dies carried thereby, pressing mechanism arranged above the path of travel of the dies, a pair of shears arranged adjacent the pressing mechanism and above the path of travel of the dies, means whereby the pressing mechanism is elevated and suitable means carried by the elevating means, for operating the shears, substantially as specified.

10. In a glass-pressing machine, a rotating die-carrying table, pressing mechanism arranged above the table, a pair of shears arranged above the table, means whereby the pressing mechanism is raised and lowered, means carried by the elevating mechanism for operating the shears, table-rotating mechanism arranged beneath the table, and connections between the elevating mechanism and table-rotating mechanism, whereby the table is partially rotated when the pressing mechanism and shear-operating mechanism are elevated, substantially as specified.

CHRISTIAN JULIUS KOENIG.

Witnesses:
B. J. O'NEILL,
T. J. TERRELL.